United States Patent [19]

Duckworth

[11] Patent Number: 5,264,235
[45] Date of Patent: * Nov. 23, 1993

[54] FOOD PRODUCT

[75] Inventor: Michael Duckworth, Bedford, United Kingdom

[73] Assignee: Campbell Frozen Foods Ltd., Salford, England

[*] Notice: The portion of the term of this patent subsequent to Jan. 12, 2010 has been disclaimed.

[21] Appl. No.: 899,612

[22] Filed: Jun. 15, 1992

Related U.S. Application Data

[62] Division of Ser. No. 634,130, Jan. 4, 1991, Pat. No. 5,178,895.

[30] Foreign Application Priority Data

Jul. 4, 1988 [GB] United Kingdom ............... 8815880

[51] Int. Cl.$^5$ ................................................. A23L 1/05
[52] U.S. Cl. .................................. 426/589; 426/661; 426/106
[58] Field of Search ............... 426/589, 661, 234, 243, 426/106

[56] References Cited

U.S. PATENT DOCUMENTS

| | | | |
|---|---|---|---|
| 4,220,671 | 9/1980 | Kahn | 426/589 |
| 4,363,824 | 12/1982 | Willi | 426/589 |
| 4,368,212 | 1/1983 | Heckman | 426/589 |
| 4,415,599 | 11/1983 | Bos | 426/579 |
| 4,425,368 | 1/1984 | Walkins | 426/234 |
| 4,492,714 | 1/1985 | Cooper | 426/602 |
| 4,568,551 | 2/1986 | Seewi | 426/99 |
| 4,810,518 | 3/1989 | Haisman | 426/589 |

OTHER PUBLICATIONS

Maltren, The Functional Edge, Brochure, p. 16.

Primary Examiner—Carolyn Paden
Attorney, Agent, or Firm—Synnestvedt & Lechner

[57] ABSTRACT

A frozen precursor of a starch-thickened, cream-style food product, drinkable after heating without stirring in a microwave oven, comprising a freeze-resistant container suitable for heating in a microwave oven, a homogenous mixture in the container, the container and the mixture being at a temperature in a range from about −15° to about −20° C. The mixture comprises product flavoring components, spray-dried creaming ingredients based on vegetable oil, and granules of at least one acid-stable and freeze-thaw stable starch and maltodextrin in water, the starch granules being heat-swollen to about 70% to about 80% of their total swelling potential.

11 Claims, 1 Drawing Sheet

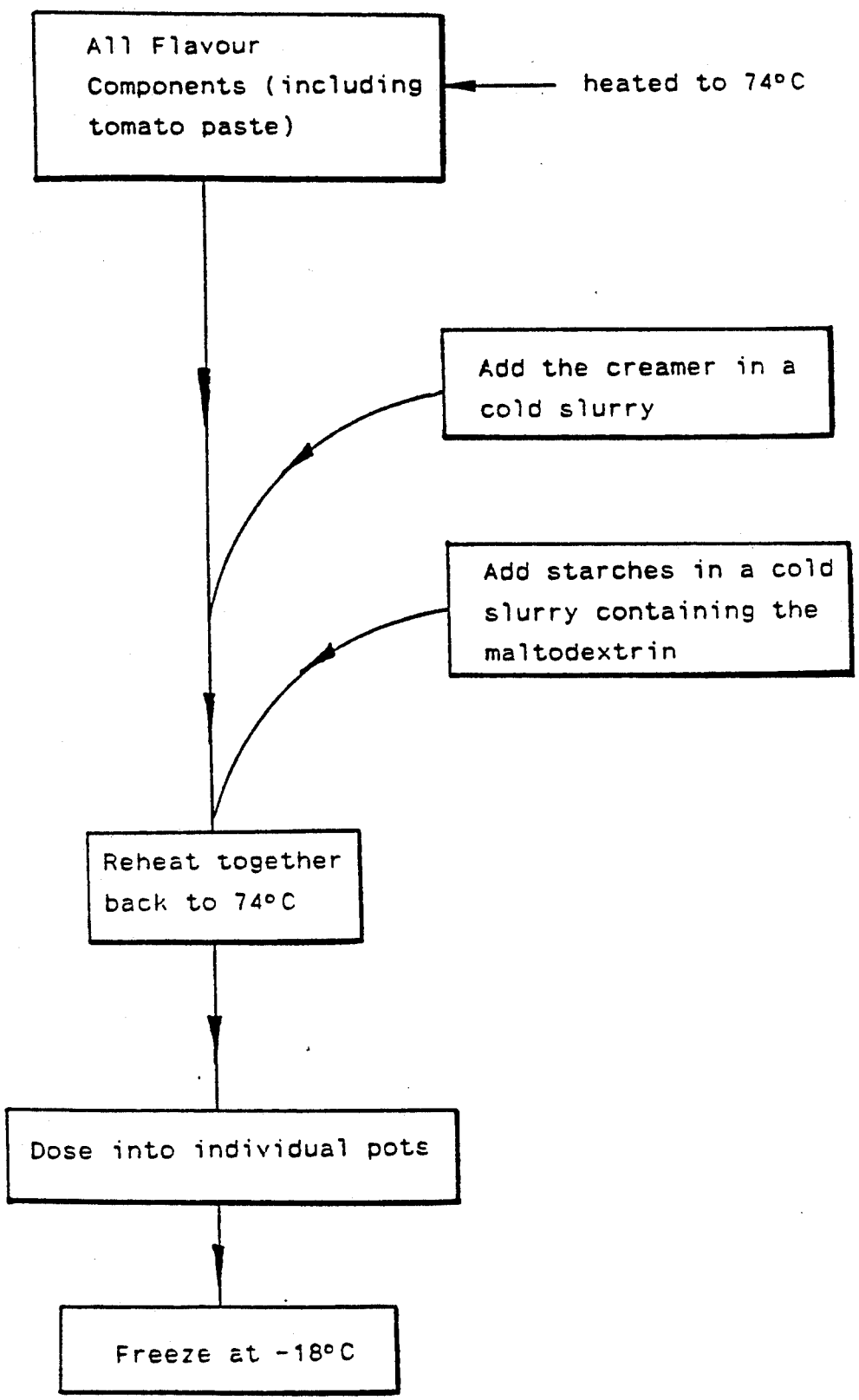

FOOD PRODUCT

This is a divisional of copending application Ser. No. 07/634,130 filed on Jan. 4, 1991 which is now U.S. Pat. No. 8,178,895.

BACKGROUND OF THE INVENTION

This invention relates to a food product and in particular to a frozen, cream-style, starch-containing product which is consumable after microwave preparation without stirring. The invention has particular utility in the production and preparation of a hot drinkable cream-style soup, but can also extend to sweetened dessert products such as custards and milk shakes and to savoury products such as sauces and gravies.

SUMMARY OF THE INVENTION

According to one aspect of the invention a frozen food product comprises an aqueous phase substantially uniformly dispersing a starch system and an oleaginous system, the aqueous phase containing at least one dissolved freezing point depressant to provide some free water substantially uniformly dispersed throughout the product, the oleaginous system including at least one fat in the form of particles of sizes less than 10 microns and the starch system comprising at least one starch in a partially gelatinised state and at least one humectant to act as a water activity depressant for the starch system.

Suitably the starch(es) in the starch system has/have a gelatinisation temperature between 70° and 75° C. Conveniently the starch(es) constitute(s) from some 2% w/w to 5% w/w of the product. The starch(es) require(s) to be freeze/thaw stable and is/are preferably also acid stable.

Desirably the particles of fat in the oleaginous system have a size of less than 2 microns and conveniently are spray dried on a water activity reducing carrier (e.g. maltodextrin).

Conveniently the product is frozen in volumes of between 100 and 200 ml in at least substantially microwave transparent drinking vessels. Suitably the vessels can be removed from a microwave oven after thawing and heating the product and can be supported with a near-boiling aqueous phase within the vessel in a thermally unprotected hand.

In a preferred form, the product is a volume of 150 ml to 170 ml of frozen cream-style soup which can be transformed into a hot drinkable product of moderate viscosity directly from the frozen state (e.g. at −18° C.) with no stirring after approximately 3 minutes in a microwave oven (e.g. operating at some 2450 megahertz and 600 watts) and comprises (a) a partially gelatinised starch system based on at least one acid stable, freeze-/thaw stable, modified waxy maize starch having a gelatinisation temperature at around 75° C., (b) an oleginous system comprising droplets of less than 10 microns in diameter of hydrogenated vegetable oil, (c) an aqueous phase dispersing the two systems (a) and (b) substantially homogeneously, the aqueous phase including ice particles dispersed in free water and (d) maltodextrin dissolved in the free water to create a substantially continuous carrier phase for systems (a) and (b).

According to a further aspect of this invention, a process for manufacturing the precursor of a recently-thawed drinkable, starch-thickened, cream-style food product, heated from a frozen state without stirring in a microwave oven, comprises forming a homogeneous mixture of product flavouring components, spray dried creaming ingredient based on vegetable oil, granules of at least one acid stable, freeze/thaw stable starch ano maltodextrin in water, heating the mixture to a temperature at which swelling of the starch granules will commence for a time to produce between say 70% and 80% of the total swelling potential of the starch granules, dispensing the mixture into individual containers intended to contain the product while heated in a microwave oven and while subsequently consumed, and freezing the containers and dispensed mixture to a temperature of between −15° and −20° C.

The extent to which the starch granules are swollen prior to freezing will be determined on the basis of the post-freezing microwave heating cycle to which the product will be subjected prior to consumption but the range quoted above will be typical. For a volume of 150 to 170 ml of cream soup subjected to 3¼ minutes of microwave heating from frozen a percentage swelling of some 95% would be typical. A gelatinisation temperature for the starch granules would conveniently be around 75° C.

The proportions of starch(es), fat, flavouring components and the amount and type of maltodextrin used in the mixture will be determined by the end product, but typical proportions for two soup mixes is given hereafter. Whey powder can be added to the starch system if required to modify texture/taste properties of the product.

The creaming ingredient can be a spray dried hydrogenated vegetable oil of droplet size two microns or less on a maltodextrin carrier and can be added in a cold water-based slurry to a hot aqueous mix of the flavouring components. The starch(es) can be added subsequently also in a cold aqueous slurry containing maltodextrin and the heating to swell the starch granules to the required extent is conducted as the final hot processing stage prior to dispensing the mixture into individual portion-sized ready-to-serve containers preparatory to freezing. The use of a liquid creaming ingredient of fat droplet size less than ten microns (and preferably less than two microns) is not ruled out.

Whilst not attempting a full explanation of the processes involved, it is believed that the maltodextrin acts as a humectant or water activity depressant in the aqueous mixture. This has two effects, firstly it prevents further swelling of the starch granules until the temperature during the microwave heating increases to a point where starch granule swelling can be complicated without causing the generation of lumps in the mixture. Secondly, it maximises the amount of free water which is present in the frozen product and which is uniformly distributed. This water is available to interact with microwave energy and hence raise the temperature and so uniformly melt the ice. By ensuring that the starch granules present in the frozen state of the product have only developed no more than 75% of the final thickness and the fat (to develop the cream-style taste and appearance) is present in a microemulsion of particles of a size less than 10 microns (and preferably less than 2 microns) it is ensured that a substantially homogeneous mixture of starch and oleaginous systems occurs in the freezing point depressed aqueous solution so that as a fully liquid system develops during heating in microwaves, a drinkable product results which does not need agitation (e.g. stirring) to give it an acceptable physical consistency.

BRIEF DESCRIPTION OF THE DRAWING

The accompanying drawing is a flow chart illustrating a preferred commercial procedure for the commercial production of tomato soup according to Example I thereof.

DESCRIPTION OF THE PREFERRED EMBODIMENTS

By way of non-limiting examples, the following give compositions of two soups in accordance with this invention.

EXAMPLE I

Tomato Soup-per 150 ml unit

| Thickener levels & types | ColFlo 67 | 2.4 g |
| --- | --- | --- |
| | Purity W | 1.125 g |
| | | 3.525 g |

Both these products are ungelatinised waxy maize starches which are both acid stable and freeze/thaw stable.

| | Tomato Paste (32% solids) | 10.80 g |
| --- | --- | --- |
| Creamer level and type | Hydrogenated vegetable oil in a spray-dried form on maltodextrin-emulsifier and stabiliser. | 5.025 g |
| Dispersants (water activity depressants) | Maltodextrin | 3.00 g |
| | Sugar | 7.50 g |
| Flavours | | |
| | Salt | 1.65 g |
| | Citric acid | 2.90 g |
| | Spice Mix | 0.20 g |

EXAMPLE II

Chicken Soup

| Thickener levels & types | ColFlo 67 | 3.525 g |
| --- | --- | --- |
| | Purity W | 1.687 g |
| | | 5.21 g |
| Creamer levels & types | Hydrogenated vegetable oil on a powdered maltodextrin carrier (The ratio of oil to carrier can be altered to give different types of creaminess) | 3.09 g |
| | Whey powder | 1.5 g |
| | | 4.59 g |
| Dispersants (water activity depressants) | Maltodextrin | 3.0 g * |
| Flavours | Yeatex (approx.) | 0.3 g |
| | Onion powder | 0.15 g |
| | Spice mix & Salt | to taste |

* The level of maltodextrin will be dependent on the type and level of thickener used.

I claim:

1. A precursor of a drinkable, starch-thickened, cream-style food product made by the process of:
   forming a homogeneous mixture of product-flavoring components, spray-dried creaming ingredients based on vegetable oil, granules of at least one acid-stable, freeze-thaw stable starch and maltodextrin in water;
   heating the mixture to a temperature at which swelling of the starch granules will commence, for a time sufficient to produce between 70% and 80% of the total swelling potential of the starch granules;
   dispensing the mixture into individual containers suitable for containing the product while it is later-heated in a microwave oven and while it is subsequently consumed; and
   freezing the containers and the dispensed mixture therein to a temperature of between $-15°$ and $-20°$ C.

2. A frozen precursor of a starch-thickened, cream-style food product, drinkable after heating without stirring in a microwave oven, comprising:
   a freeze-resistant container suitable for heating in a microwave oven;
   a homogenous mixture in said containers;
   said container and said mixture being at a temperature in a range from about $-15°$ to about $-20°$ C.;
   said mixture comprising product flavoring components, spray-dried creaming ingredients based on vegetable oil, and granules of at least one acid-stable and freeze-thaw stable starch and maltodextrin in water;
   said starch granules being heat-swollen to about 70% to about 80% of their total swelling potential.

3. The frozen precursor of claim 2, wherein said spray-dried creaming ingredients comprise at least one fat in the form of particles of size less than 10 microns, and said starch comprises at least one starch in a partially gelatinized state; said starch and said fat being substantially uniformly dispersed in an aqueous phase; said aqueous phase containing at least one dissolved freezing point depressant and at least one humectant to act as a water depressant for said starch.

4. The product as claimed in claim 3, in which said starch has a gelatinization temperature between about 70° and 75° C.

5. A product as claimed in claim 3, in which said starch constitutes from about 2% to 5% by weight of said product.

6. A product as claimed in claim 3, in which said particles of fat have a size of less than 2 microns.

7. A product as claimed in claim 3, in which said particles of fat are spray-dried in a water-activity reducing carrier.

8. A product as claimed in claim 7, in which said carrier is maltodextrin.

9. A product as claimed in claim 3, in which said container is a drinking vessel holding 100 to 200 milliliters and substantially transparent to microwaves.

10. A product as claimed in claim 9, in which said vessel is such that it can be removed by a thermally unprotected hand from a microwave oven, with said aqueous phase at a near-boiling temperature.

11. A product as claimed in claim 3, in which said starch is partially gelatinized and based on a modified waxy maize starch having a gelatinization temperature around 75° C., said creaming ingredients comprise droplets of less than 10 microns diameter of hydrogenated vegetable oil, said aqueous phase dispersing said creaming ingredient and said starch substantially homogeneously, and said aqueous phase including ice particles dispersed in free water and maltodextrin dissolved in free water to create a substantially continuous carrier phase for said creaming ingredient and said starch.

* * * * *